United States Patent
Jasinski

(10) Patent No.: US 10,419,664 B2
(45) Date of Patent: Sep. 17, 2019

(54) IMAGE SENSORS WITH PHASE DETECTION PIXELS AND A VARIABLE APERTURE

(71) Applicant: SEMICONDUCTOR COMPONENTS INDUSTRIES, LLC, Phoenix, AZ (US)

(72) Inventor: David Wayne Jasinski, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/856,750

(22) Filed: Dec. 28, 2017

(65) Prior Publication Data

US 2019/0208118 A1    Jul. 4, 2019

(51) Int. Cl.
*H04N 5/232* (2006.01)
*G01C 3/08* (2006.01)
*H04N 5/369* (2011.01)

(52) U.S. Cl.
CPC ........... *H04N 5/23229* (2013.01); *G01C 3/08* (2013.01); *H04N 5/23212* (2013.01); *H04N 5/3696* (2013.01)

(58) Field of Classification Search
CPC .. G01C 3/08; H04N 5/23229; H04N 5/23212; H04N 5/3696
See application file for complete search history.

(56) References Cited

U.S. PATENT DOCUMENTS

| | | | |
|---|---|---|---|
| 9,749,532 B1 * | 8/2017 | Hinkel | G02B 27/646 |
| 2010/0013947 A1 * | 1/2010 | Oikawa | G03B 13/36 348/222.1 |
| 2016/0267667 A1 | 9/2016 | Wajs | |
| 2016/0269600 A1 | 9/2016 | Wajs | |
| 2016/0286108 A1 | 9/2016 | Fettig et al. | |
| 2017/0150019 A1 * | 5/2017 | Kyung | H04N 5/23212 |

\* cited by examiner

*Primary Examiner* — Huy T Nguyen
(74) *Attorney, Agent, or Firm* — Treyz Law Group, P.C.; Joseph F. Guihan

(57) ABSTRACT

An imaging system may include an image sensor with phase detection pixel groups for depth sensing or automatic focusing operations. Each phase detection pixel group may have two or more photosensitive regions covered by a single microlens so that each photosensitive region has an asymmetric angular response. The imaging system may use image data from the phase detection pixel group to determine a phase difference. Alternatively, to improve accuracy, the imaging system may obtain two sets of image data using two different aperture sizes. The phase difference associated with each aperture size may be determined. The difference between the two phase differences may be determined and used as a more accurate metric for depth sensing or automatic focusing operations.

20 Claims, 10 Drawing Sheets

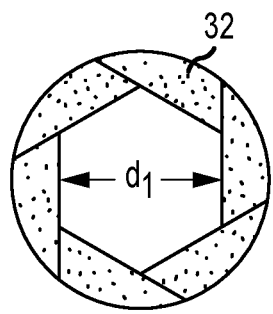 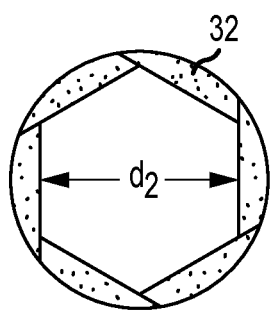
FIG.7A      FIG.7B
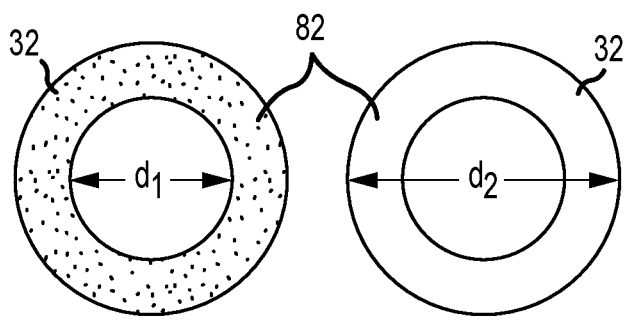
FIG.8A      FIG.8B

IMAGE SENSORS WITH PHASE DETECTION PIXELS AND A VARIABLE APERTURE

BACKGROUND

This relates generally to imaging systems and, more particularly, to imaging systems with phase detection capabilities.

Modern electronic devices such as cellular telephones, cameras, and computers often use digital image sensors. Imager sensors (sometimes referred to as imagers) may be formed from a two-dimensional array of image sensing pixels. Each pixel receives incident photons (light) and converts the photons into electrical signals. Image sensors are sometimes designed to provide images to electronic devices using a Joint Photographic Experts Group (JPEG) format.

Some applications such as automatic focusing and three-dimensional (3D) imaging may require electronic devices to provide stereo and/or depth sensing capabilities. For example, to bring an object of interest into focus for an image capture, an electronic device may need to identify the distances between the electronic device and object of interest. To identify distances, conventional electronic devices use complex arrangements. Some arrangements require the use of multiple image sensors and camera lenses that capture images from various viewpoints. Other arrangements require the addition of lenticular arrays that focus incident light on sub-regions of a two-dimensional pixel array. Due to the addition of components such as additional image sensors or complex lens arrays, these arrangements lead to reduced spatial resolution, increased cost, and increased complexity.

Some electronic devices include both image pixels and phase detection pixels in a single image sensor. With this type of arrangement, a camera can use the on-chip phase detection pixels to focus an image without requiring a separate phase detection sensor. However, the angular response of each phase detection pixel may vary according the position of the phase detection pixel in the pixel array. This can lead to inaccurate depth calculations.

It would therefore be desirable to be able to provide improved phase detection pixel arrangements for image sensors.

BRIEF DESCRIPTION OF THE DRAWINGS

FIGS. 7A and 7B are top views of an illustrative mechanical shutter that may be used to cover an image sensor with phase detection pixels in accordance with an embodiment.

FIGS. 8A and 8B are top views of an illustrative liquid crystal display shutter that may be used to cover an image sensor with phase detection pixels in accordance with an embodiment.

DETAILED DESCRIPTION

Figure 1:
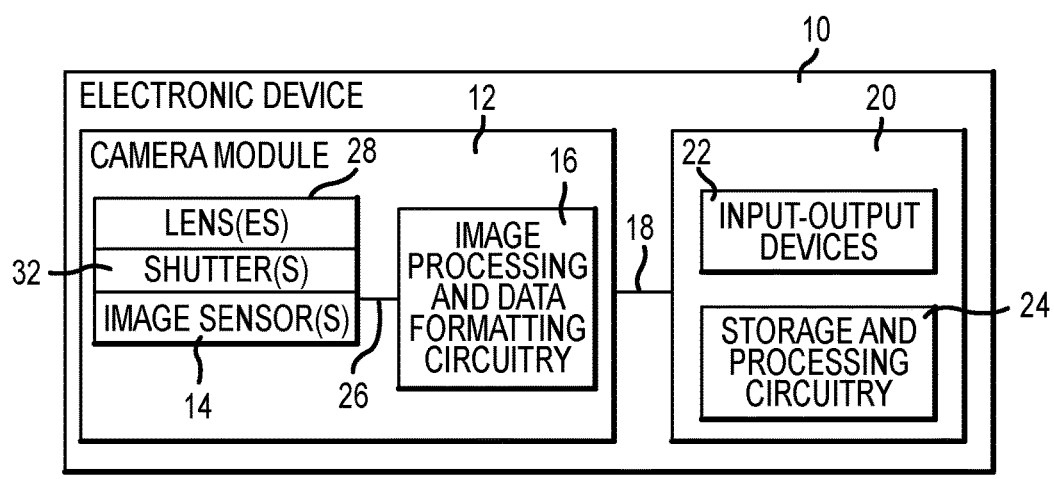
FIG. 1 is a schematic diagram of an illustrative electronic device with an image sensor that may include phase detection pixels in accordance with an embodiment.

Embodiments of the present invention relate to image sensors with automatic focusing and depth sensing capabilities. An electronic device with a camera module is shown in FIG. 1. Electronic device 10 may be a digital camera, a computer, a cellular telephone, a medical device, or other electronic device. Camera module 12 (sometimes referred to as an imaging device or imaging system) may include one or more image sensors 14, one or more shutters 32, and one or more lenses 28. During operation, lenses 28 (sometimes referred to as optics 28) focus light onto image sensor 14. Light from lenses 28 may pass through an aperture (opening) in shutter 32 to reach image sensor 14. Image sensor 14 includes photosensitive elements (e.g., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 14 may be provided to image processing and data formatting circuitry 16. Image processing and data formatting circuitry 16 may be used to perform image processing functions such as automatic focusing functions, depth sensing, data formatting, adjusting white balance and exposure, implementing video image stabilization, face detection, etc. For example, during automatic focusing operations, image processing and data formatting circuitry 16 may process data gathered by phase detection pixels in image sensor 14 to determine the magnitude and direction of lens movement (e.g., movement of lens 28) needed to bring an object of interest into focus. Image processing and data formatting circuitry may be used to store calibration information that is used to help perform the depth sensing. Control circuitry (e.g., control circuitry in image processing and data formatting circuitry 16) may also be included in the imaging system to control lens(es) 28 and shutter(s) 32.

Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common integrated circuit. The use of a single integrated circuit to implement camera sensor 14 and image processing and data formatting circuitry 16 can help to reduce costs. This is, however, merely illustrative. If desired, camera sensor 14 and image processing and data formatting circuitry 16 may be implemented using separate integrated circuits. For example, camera sensor 14 and image processing circuitry 16 may be formed on separate substrates that have been stacked.

Camera module 12 may convey acquired image data to host subsystems 20 over path 18 (e.g., image processing and data formatting circuitry 16 may convey image data to subsystems 20). Electronic device 10 typically provides a user with numerous high-level functions. In a computer or advanced cellular telephone, for example, a user may be provided with the ability to run user applications. To implement these functions, host subsystem 20 of electronic device 10 may include storage and processing circuitry 24 and input-output devices 22 such as keypads, input-output ports, joysticks, and displays. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, or other processing circuits.

It may be desirable to provide image sensors with depth sensing capabilities (e.g., to use in automatic focusing applications, 3D imaging applications such as machine vision applications, etc.). To provide depth sensing capabilities, image sensor 14 may include phase detection pixel groups such as pixel group 100 (sometimes referred to as pixel pair 100) shown in FIG. 2A.

Figure 2A:
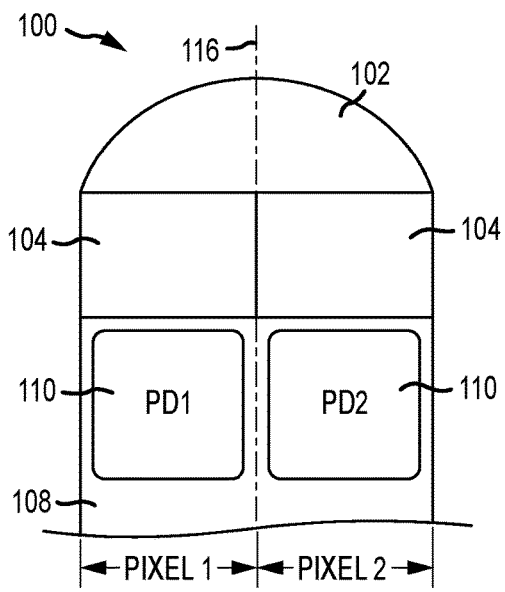
FIG. 2A is a cross-sectional view of illustrative phase detection pixels having photosensitive regions with different and asymmetric angular responses in accordance with an embodiment.

FIG. 2A is an illustrative cross-sectional view of pixel pair 100. Pixel pair 100 may include first and second pixels such as Pixel 1 and Pixel 2. Pixel 1 and Pixel 2 may include photosensitive regions 110 formed in a substrate such as silicon substrate 108. For example, Pixel 1 may include an associated photosensitive region such as photodiode PD1, and Pixel 2 may include an associated photosensitive region such as photodiode PD2. A microlens may be formed over photodiodes PD1 and PD2 and may be used to direct incident light towards photodiodes PD1 and PD2. The arrangement of FIG. 2A in which microlens 102 covers two pixel regions may sometimes be referred to as a 2×1 or 1×2 arrangement because there are two phase detection pixels arranged consecutively in a line. Microlens 102 may have a width and a length, with the length being longer than the width. Microlens 102 may have a length that is about (e.g., within 5% of) twice as long as its width. Microlens 102 may be in the shape of an ellipse with an aspect ratio of about (e.g., within 5% of) 2:1. In other embodiments, microlens 102 may be another shape such as a rectangle or another desired shape. Microlens 102 may have an aspect ratio of 1:1, less than 2:1, 2:1, greater than 2:1, greater than 3:1, or any other desired aspect ratio.

Color filters such as color filter elements 104 may be interposed between microlens 102 and substrate 108. Color filter elements 104 may filter incident light by only allowing predetermined wavelengths to pass through color filter elements 104 (e.g., color filter 104 may only be transparent to the certain ranges of wavelengths). Photodiodes PD1 and PD2 may serve to absorb incident light focused by microlens 102 and produce pixel signals that correspond to the amount of incident light absorbed.

Photodiodes PD1 and PD2 may each cover approximately half of the substrate area under microlens 102 (as an example). By only covering half of the substrate area, each photosensitive region may be provided with an asymmetric angular response (e.g., photodiode PD1 may produce different image signals based on the angle at which incident light reaches pixel pair 100). The angle at which incident light reaches pixel pair 100 relative to a normal axis 116 (i.e., the angle at which incident light strikes microlens 102 relative to the optical axis 116 of lens 102) may be herein referred to as the incident angle or angle of incidence.

The arrangement of FIG. 2A in which microlens 102 covers two pixel regions may sometimes be referred to as a 2×1 or 1×2 arrangement because there are two phase detection pixels arranged consecutively in a line. In an alternate embodiment, three phase detection pixels may be arranged consecutively in a line in what may sometimes be referred to as a 1×3 or 3×1 arrangement. In other embodiments, phase detection pixels may be grouped in a 2×2 (with four pixels covered by a single microlens) or 2×4 (with eight pixels covered by a single microlens) arrangement. In general, phase detection pixels may be arranged in any desired manner.

An image sensor can be formed using front side illumination imager arrangements (e.g., when circuitry such as metal interconnect circuitry is interposed between the microlens and photosensitive regions) or back side illumination imager arrangements (e.g., when photosensitive regions are interposed between the microlens and the metal interconnect circuitry). The example of FIGS. 2A, 2B, and 2C in which pixels 1 and 2 are backside illuminated image sensor pixels is merely illustrative. If desired, pixels 1 and 2 may be front side illuminated image sensor pixels. Arrangements in which pixels are backside illuminated image sensor pixels are sometimes described herein as an example.

Figure 2B:
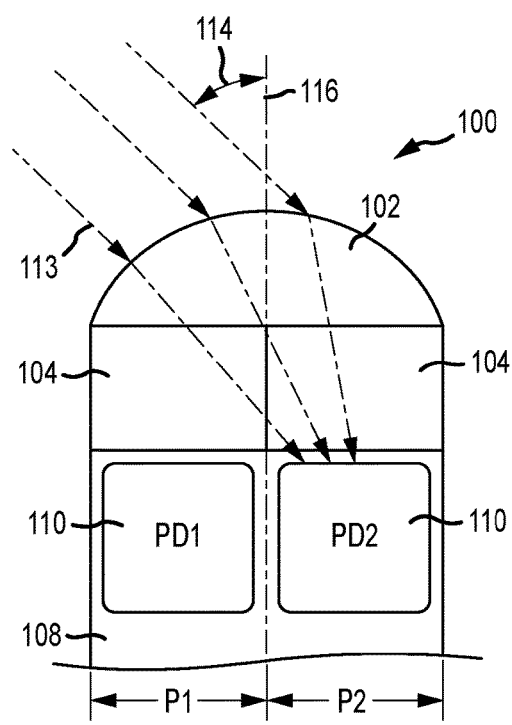
FIGS. 2B and 2C are cross-sectional views of the phase detection pixels of FIG. 2A in accordance with an embodiment.

In the example of FIG. 2B, incident light 113 may originate from the left of normal axis 116 and may reach pixel pair 100 with an angle 114 relative to normal axis 116. Angle 114 may be a negative angle of incident light. Incident light 113 that reaches microlens 102 at a negative angle such as angle 114 may be focused towards photodiode PD2. In this scenario, photodiode PD2 may produce relatively high image signals, whereas photodiode PD1 may produce relatively low image signals (e.g., because incident light 113 is not focused towards photodiode PD1).

Figure 2C:
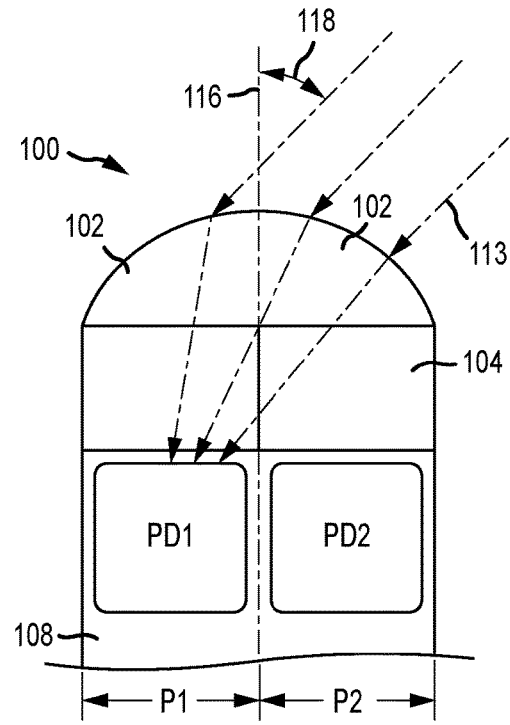

In the example of FIG. 2C, incident light 113 may originate from the right of normal axis 116 and reach pixel pair 100 with an angle 118 relative to normal axis 116. Angle 118 may be a positive angle of incident light. Incident light that reaches microlens 102 at a positive angle such as angle 118 may be focused towards photodiode PD1 (e.g., the light is not focused towards photodiode PD2). In this scenario, photodiode PD2 may produce an image signal output that is relatively low, whereas photodiode PD1 may produce an image signal output that is relatively high.

Figure 3:
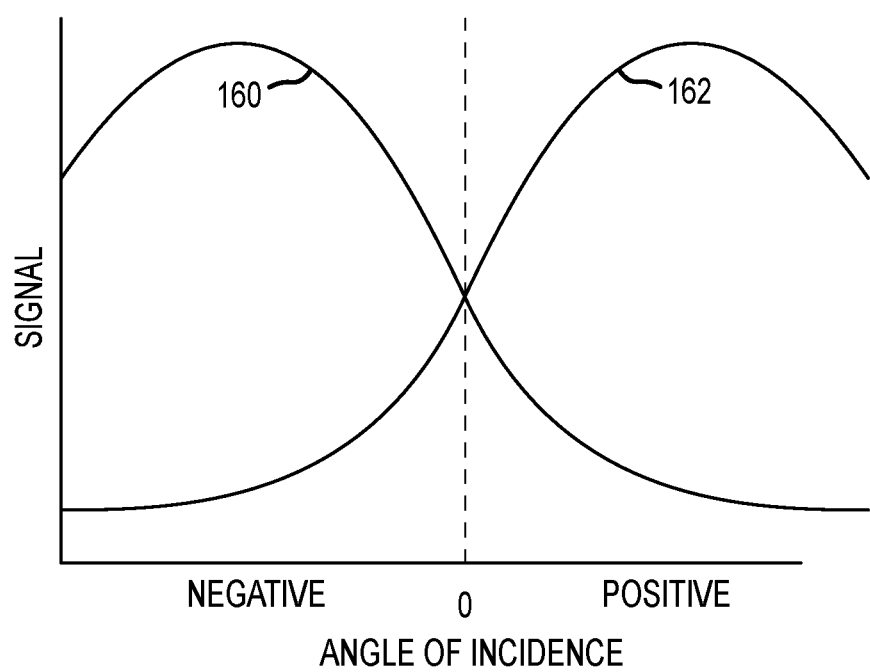
FIG. 3 is a diagram of illustrative signal outputs of phase detection pixels for incident light striking the phase detection pixels at varying angles of incidence in accordance with an embodiment.

The positions of photodiodes PD1 and PD2 may sometimes be referred to as asymmetric positions because the center of each photosensitive area 110 is offset from (i.e., not aligned with) optical axis 116 of microlens 102. Due to the asymmetric formation of individual photodiodes PD1 and PD2 in substrate 108, each photosensitive area 110 may have an asymmetric angular response (e.g., the signal output produced by each photodiode 110 in response to incident light with a given intensity may vary based on an angle of incidence). In the diagram of FIG. 3, an example of the pixel signal outputs of photodiodes PD1 and PD2 of pixel pair 100 in response to varying angles of incident light is shown.

Line 160 may represent the output image signal for photodiode PD2 whereas line 162 may represent the output image signal for photodiode PD1. For negative angles of incidence, the output image signal for photodiode PD2 may increase (e.g., because incident light is focused onto photodiode PD2) and the output image signal for photodiode PD1 may decrease (e.g., because incident light is focused away from photodiode PD1). For positive angles of incidence, the output image signal for photodiode PD2 may be relatively small and the output image signal for photodiode PD1 may be relatively large.

The size and location of photodiodes PD1 and PD2 of pixel pair 100 of FIGS. 2A, 2B, and 2C are merely illustrative. If desired, the edges of photodiodes PD1 and PD2 may be located at the center of pixel pair 100 or may be shifted slightly away from the center of pixel pair 100 in any direction. If desired, photodiodes 110 may be decreased in size to cover less than half of the pixel area.

Output signals from pixel pairs such as pixel pair 100 may be used to adjust the optics (e.g., one or more lenses such as lenses 28 of FIG. 1) in camera module 12 during automatic focusing operations. The direction and magnitude of lens movement needed to bring an object of interest into focus may be determined based on the output signals from pixel pairs 100.

For example, by creating pairs of pixels that are sensitive to light from one side of the lens or the other, a phase difference can be determined. This phase difference may be used to determine both how far and in which direction the image sensor optics should be adjusted to bring the object of interest into focus.

When an object is in focus, light from both sides of the image sensor optics converges to create a focused image. When an object is out of focus, the images projected by two sides of the optics do not overlap because they are out of phase with one another. By creating pairs of pixels where each pixel is sensitive to light from one side of the lens or the other, a phase difference can be determined. This phase difference can be used to determine the direction and magnitude of optics movement needed to bring the images into phase and thereby focus the object of interest. Pixel groups that are used to determine phase difference information such as pixel pair 100 are sometimes referred to herein as phase detection pixels or depth-sensing pixels.

A phase difference signal may be calculated by comparing the output pixel signal of PD1 with that of PD2. For example, a phase difference signal for pixel pair 100 may be determined by subtracting the pixel signal output of PD1 from the pixel signal output of PD2 (e.g., by subtracting line 162 from line 160). For an object at a distance that is less than the focused object distance, the phase difference signal may be negative. For an object at a distance that is greater than the focused object distance, the phase difference signal may be positive. This information may be used to automatically adjust the image sensor optics to bring the object of interest into focus (e.g., by bringing the pixel signals into phase with one another).

Figure 4A:
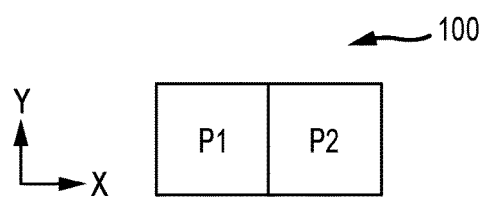
FIG. 4A is a top view of an illustrative phase detection pixel pair arranged horizontally in accordance with an embodiment.
Figure 4B:
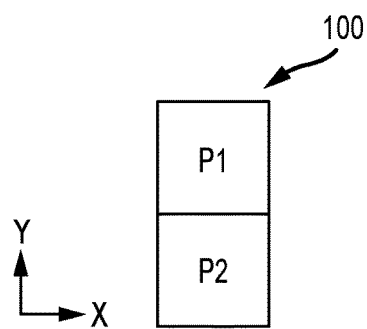
FIG. 4B is a top view of an illustrative phase detection pixel pair arranged vertically in accordance with an embodiment.
Figure 4C:
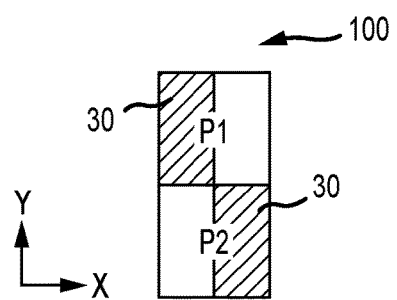
FIG. 4C is a top view of an illustrative phase detection pixel pair arranged vertically and configured to detect phase differences along the horizontal direction (e.g., across vertical edges) in accordance with an embodiment.

Pixel pairs 100 may arranged in various ways. For example, as shown in FIG. 4A, Pixel 1 (referred to herein as P1) and Pixel 2 (referred to herein as P2) of pixel pair 100 may be oriented horizontally, parallel to the x-axis of FIG. 4A (e.g., may be located in the same row of a pixel array). In the example of FIG. 4B, P1 and P2 are oriented vertically, parallel to the y-axis of FIG. 4B (e.g., in the same column of a pixel array). In the example of FIG. 4C, P1 and P2 are arranged vertically and are configured to detect phase differences in the horizontal direction, such as from vertical edges (e.g., using an opaque light shielding layer such as metal mask 30).

Figure 5:
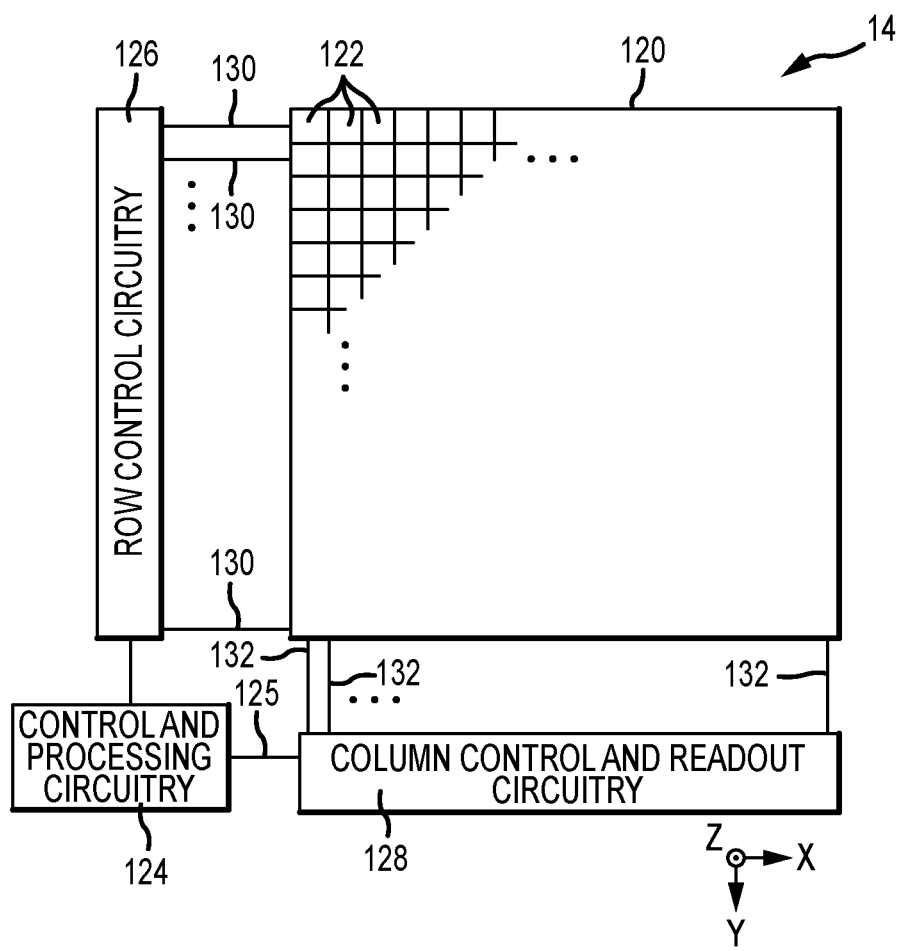
FIG. 5 is a diagram of an illustrative pixel array and associated readout circuitry for reading out image signals in an image sensor in accordance with an embodiment.

As shown in FIG. 5, image sensor 14 may include a pixel array 120 containing image sensor pixels 122 arranged in rows and columns (sometimes referred to herein as image pixels, phase detection pixels, or pixels) and control and processing circuitry 124. Array 120 may contain, for example, hundreds or thousands of rows and columns of pixels 122. Control circuitry 124 may be coupled to row control circuitry 126 and image readout circuitry 128 (sometimes referred to as column control circuitry, readout circuitry, processing circuitry, or column decoder circuitry). Row control circuitry 126 may receive row addresses from control circuitry 124 and supply corresponding row control signals such as reset, row-select, charge transfer, dual conversion gain, and readout control signals to pixels 122 over row control paths 130. One or more conductive lines such as column lines 132 may be coupled to each column of pixels 122 in array 120. Column lines 132 may be used for reading out image signals from pixels 122 and for supplying bias signals (e.g., bias currents or bias voltages) to pixels 122. If desired, during pixel readout operations, a pixel row in array 120 may be selected using row control circuitry 126 and image signals generated by image pixels 122 in that pixel row can be read out along column lines 132.

Image readout circuitry 128 may receive image signals (e.g., analog pixel values generated by pixels 122) over column lines 132. Image readout circuitry 128 may include sample-and-hold circuitry for sampling and temporarily storing image signals read out from array 120, amplifier circuitry, analog-to-digital conversion (ADC) circuitry, bias circuitry, column memory, latch circuitry for selectively enabling or disabling the column circuitry, or other circuitry that is coupled to one or more columns of pixels in array 120 for operating pixels 122 and for reading out image signals from pixels 122. ADC circuitry in readout circuitry 128 may convert analog pixel values received from array 120 into corresponding digital pixel values (sometimes referred to as digital image data or digital pixel data). Image readout circuitry 128 may supply digital pixel data to control and processing circuitry 124 and/or image processing and data formatting circuitry 16 (FIG. 1) over path 125 for pixels in one or more pixel columns.

If desired, image pixels 122 may include one or more photosensitive regions for generating charge in response to image light. Photosensitive regions within image pixels 122 may be arranged in rows and columns on array 120. Pixel array 120 may be provided with a color filter array having multiple color filter elements which allows a single image sensor to sample light of different colors. As an example, image sensor pixels such as the image pixels in array 120 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two color filters, with two green color filters diagonally opposite one another and adjacent to a red color filter diagonally opposite to a blue color filter. In another suitable example, the green color filters in a Bayer pattern are replaced by broadband color filter elements (e.g., a yellow, magenta, or clear color filter element). These examples are merely illustrative and, in general, color filter elements of any desired color and in any desired pattern may be formed over any desired number of pixels 122.

If desired, array 120 may be part of a stacked-die arrangement in which pixels 122 of array 120 are split between two or more stacked substrates. In such an arrangement, each of the pixels 122 in the array 120 may be split between the two dies at any desired node within pixel. As an example, a node such as the floating diffusion node may be formed across two dies. Pixel circuitry that includes the photodiode and the circuitry coupled between the photodiode and the desired node (such as the floating diffusion node, in the present example) may be formed on a first die, and the remaining pixel circuitry may be formed on a second die. The desired node may be formed on (i.e., as a part of) a coupling structure (such as a conductive pad, a micro-pad, a conductive interconnect structure, or a conductive via) that connects the two dies. Before the two dies are bonded, the coupling structure may have a first portion on the first die and may have a second portion on the second die. The first die and the second die may be bonded to each other such that first portion of the coupling structure and the second portion of the coupling structure are bonded together and are electrically coupled. If desired, the first and second portions of the coupling structure may be compression bonded to each other. However, this is merely illustrative. If desired, the first and second portions of the coupling structures formed on the respective first and second dies may be bonded together using any known metal-to-metal bonding technique, such as soldering or welding.

As mentioned above, the desired node in the pixel circuit that is split across the two dies may be a floating diffusion node. Alternatively, the node between a floating diffusion region and the gate of a source follower transistor (i.e., the floating diffusion node may be formed on the first die on which the photodiode is formed, while the coupling structure may connect the floating diffusion node to the source follower transistor on the second die), the node between a floating diffusion region and a source-drain node of a transfer transistor (i.e., the floating diffusion node may be formed on the second die on which the photodiode is not located), the node between a source-drain node of a source-follower transistor and a row select transistor, or any other desired node of the pixel circuit.

Figure 6:
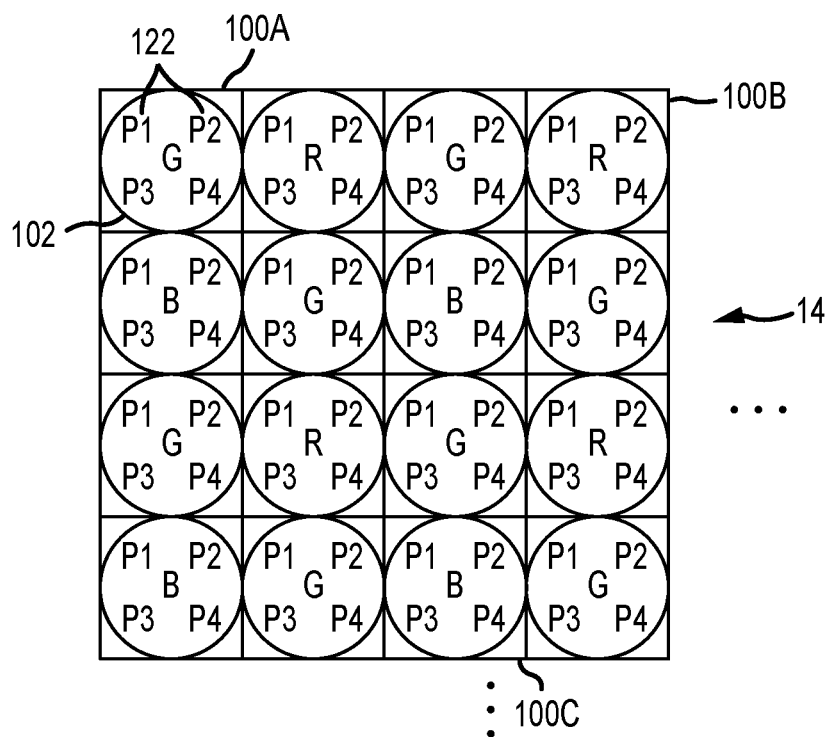
FIG. 6 is a top view of an illustrative image sensor with phase detection pixel groups that have four phase detection pixels in a 2×2 arrangement covered by a single microlens in accordance with an embodiment.

FIG. 6 is an illustrative diagram showing an image sensor 14 that may include phase detection pixel groups with multiple pixels covered by a single microlens 102. As shown, each pixel group 100 includes a number of pixels 122. In this illustrative example, each pixel group has four pixels (P1, P2, P3, and P4). Each pixel may have a respective photosensitive area. Each pixel in a respective group 100 may be covered by a color filter element of the same color. For example, pixels P1, P2, P3, and P4 in pixel group 100A may be covered by a green color filter element. Pixels P1, P2, P3, and P4 in pixel group 100B may be covered by a red color filter element. Pixels P1, P2, P3, and P4 in pixel group 100C may be covered by a blue color filter element. This example is merely illustrative. Each pixel may have a respective color filter element, multiple color filter elements may each cover multiple pixels in each pixel group 100, or a single color filter element may cover all four pixels in each pixel group 100.

Pixel group 100A may be a green pixel group formed adjacent to a blue pixel group, adjacent to a red pixel group, and diagonally opposite a second green pixel group to form a unit cell of repeating pixel groups 100. In this way, a Bayer mosaic pattern of pixel groups 100 may be created where each pixel group 100 includes four sub-pixels 122 arranged in two corresponding adjacent rows and two corresponding adjacent columns.

Forming each pixel group 100 with a single microlens 102 that covers a number of pixels 122 of the same color enables image sensor 14 to have phase detection capabilities. As discussed in connection with FIGS. 2A-2C and FIG. 3, covering multiple photodiodes with a single microlens may provide the photodiodes with an asymmetric angular response to incident light. The data acquired from the pixels may then be used to obtain phase detection data. In some examples, the data acquired from two pixels in the phase detection pixel group may be compared to obtain phase detection data.

Any pair of pixels may be used to obtain phase detection data. Pixels may be used that are in the same row (e.g., P1 and P2 or P3 and P4), in the same column (e.g., P1 and P3 or P2 and P4), or diagonally opposite each other (e.g., P1 and P4 or P2 and P3). The variety of available sub-pixel combinations enables image sensor 14 to detect a variety of types of edges. Horizontally oriented phase detection pixel pairs (e.g., P1 and P2) may be better suited to detect vertical edges in a scene, whereas vertically oriented phase detection pixel pairs (e.g., P1 and P3) may be better suited to detect horizontal edges in a scene. Similarly, the sub-pixels that are diagonally opposite each other (e.g., P1 and P4 or P2 and P3) may be suited to detect diagonal edges in the scene. In certain embodiments, image sensor 14 may use image processing circuitry 16 to use the data from P1, P2, P3, and P4 to search for edges in all orientations. Additionally, because different colored pixels (e.g., red, blue, green, etc.) all have phase detection capabilities, image sensor 14 may be able to detect edges in multiple colors. This will further improve the phase detection capabilities of image sensor 14.

The arrangement of FIG. 6 results in phase detection data being obtained across the entire pixel array of the image sensor. This results in a greater quantity of phase detection data available which may result in improved phase detection. In particular, the high density of phase detection pixels may improve resolution of fine details throughout the scene. In certain applications, the phase detection data from across the entire pixel array may be used to create a depth map of the entire captured scene.

There are multiple ways to use phase detection data from phase detection pixel groups to determine a distance between the sensor and an object. For example, in one illustrative embodiment, the phase difference between two pixels with asymmetric responses to incident light may be used to determine a distance of the object of interest from the sensor. This method relies on an absolute measurement of the object (because image data from one image is used to determine the distance). However, in another embodiment, a relative measurement may be used. Phase difference may have a known relationship to the aperture of a shutter in the imaging system. Therefore, sequential images captured by the image sensor with different apertures may be compared to determine the distance to the object of interest. This relative measurement may eliminate systematic errors caused by microlens placement, optical point spread function shape, pattern noise, etc.

Image sensor 14 may have an associated aperture, which is an opening that allows light to reach the image sensor. A shutter such as shutter 32 in FIG. 1 may define the aperture for the image sensor. For example, a shutter may be incorporated between image sensor 14 and an accompanying lens 28 (as shown in FIG. 1). The shutter may be able to open and close to define apertures of different sizes that allow different amounts of light to reach the underlying image sensor.

FIGS. 7A and 7B show an embodiment of a shutter with a variable aperture that may be used in imaging system 12. FIGS. 7A and 7B show a mechanical shutter that may physically open and close to define apertures of different sizes. FIG. 7A shows an aperture with a first f-number (e.g., f/2). The f-number of an optical system is the ratio of the focal length to the diameter of the aperture. In FIG. 7B, the shutter is opened further (relative to FIG. 7A) and the aperture has a smaller f-number than in FIG. 7A. The aperture of shutter 32 in FIG. 7A has a diameter of $d_1$ that is smaller than the diameter $d_2$ of the aperture of shutter 32 in FIG. 7B. The shutter of FIGS. 7A and 7B is a diaphragm shutter. However, this example is merely illustrative and any desired type of shutter may be used. The shutter does not need to be a mechanical shutter (as shown in FIGS. 7A and 7B).

FIGS. 8A and 8B show an embodiment of a liquid crystal display shutter with a variable aperture that may be used in imaging system 12. As shown in FIG. 8A, shutter 32 may include liquid crystal display material 82. Liquid crystal display material 82 may include a liquid crystal layer interposed between a lower polarizer and an upper polarizer. Electrodes may apply voltage to the liquid crystal layer to control the transparency of the liquid crystal layer. The liquid crystal layer may be selectively made either opaque or transparent. As shown in FIG. 8A, when the liquid crystal display material is opaque the aperture may have a diameter $d_1$ (e.g., corresponding to a first f-number). The liquid crystal display material may also be made transparent as shown in FIG. 8B. In FIG. 8B, the aperture has a diameter of $d_2$ (e.g., corresponding to a second f-number that is lower than the first f-number).

Figure 9:
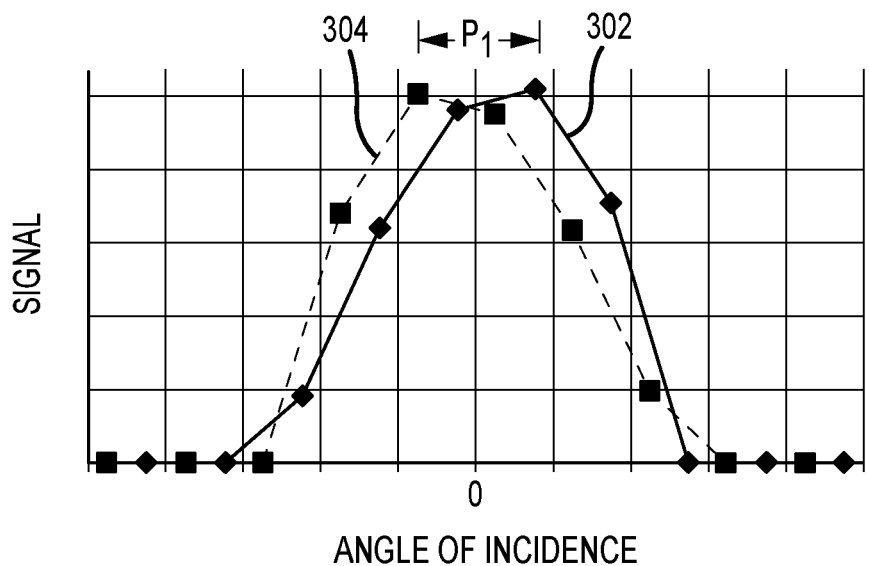
FIG. 9 is a diagram of illustrative signal outputs of phase detection pixels for incident light striking the phase detection pixels through an aperture at varying angles of incidence in accordance with an embodiment.

As previously discussed, shutter 32 may control the aperture of the imaging system. The size of aperture may influence the asymmetric response (and therefore, the phase differences) of the phase detection pixel groups in the image sensor. FIG. 9 shows an illustrative graph of signal outputs for incident light striking phase detection pixels at varying angles of incidence in an imaging system with a first f-number (e.g., f/2). Line 302 may represent the output image signal for a left-side pixel in a phase detection pixel group (e.g., Pixel 1 in FIG. 2A or P1 in FIG. 6) whereas line 304 may represent the output image signal for a right-side pixel in a phase detection pixel group (e.g., Pixel 2 in FIG. 2A or P2 in FIG. 6). The two signal responses may have a phase difference $P_1$ that captures the offset between the two signal responses.

When using phase detection pixels to determine the distance between the image sensor and an object of interest, the image signals are first used to determine a phase difference between the signals. This phase difference (sometimes referred to as a phase metric) is then used to determine the distance to the object of interest. The graph of FIG. 9 may be associated with an object being a first given distance from the sensor. Therefore, when a phase difference of $P_1$ is determined between image signals in real time, the imaging system may calculate that the imaged object is the first given distance from the sensor. This is an example of an absolute distance measurement (because the phase difference of the signals from a single image is used to determine distance).

Figure 10:
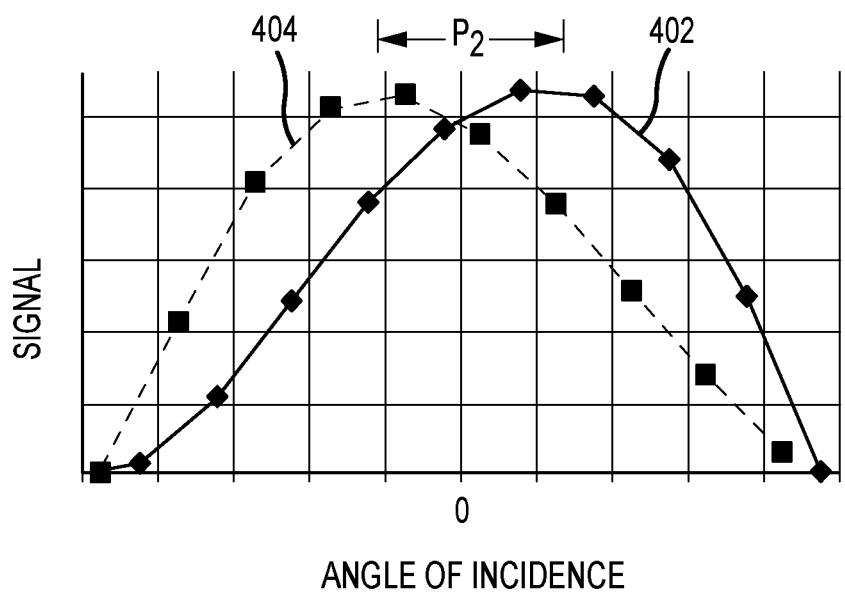
FIG. 10 is a diagram of illustrative signal outputs of phase detection pixels for incident light striking the phase detection pixels through an aperture that is larger than the aperture of FIG. 9 at varying angles of incidence in accordance with an embodiment.

FIG. 10 is shows an illustrative graph of signal outputs for incident light striking phase detection pixels at varying angles of incidence in an imaging system with a second f-number (e.g., f/1.4) that is lower than the first f-number in FIG. 9. Line 402 may represent the output image signal for a left-side pixel in a phase detection pixel group (e.g., Pixel 1 in FIG. 2A or P1 in FIG. 6) whereas line 404 may represent the output image signal for a right-side pixel in a phase detection pixel group (e.g., Pixel 2 in FIG. 2A or P2 in FIG. 6). In FIG. 10, the imaged object may be the same distance from the sensor as in FIG. 9. However, because the f-number of the imaging system is different in FIG. 10 compared to FIG. 9, the signal outputs from the left-side phase detection pixel and the right-side phase detection pixel are different. As shown, the two signal responses in FIG. 10 may have a phase difference $P_2$ that captures the offset between the two signal responses. The phase difference $P_2$ is greater than phase difference $P_1$. This relationship may hold true for other f-numbers as well. For example, as f-number decreases (as from the f-number in FIG. 9 to the f-number in FIG. 10) the phase difference between output signals increases (as from $P_1$ to $P_2$ in FIG. 9 to FIG. 10). When the imaging system is using the second f-number (e.g., the f-number of FIG. 10) and a phase difference of $P_2$ is determined between image signals in real time, the imaging system may calculate that the imaged object is the first given distance from the sensor. This is another example of an absolute distance measurement (because the phase difference of the signals from a single image is used to determine distance).

As previously discussed, a relative measurement may instead be used for distance measurements to eliminate systematic errors. With a relative measurement, the difference between phase differences with different aperture sizes may be used for the distance calculation. For example, instead of using the phase difference with a first aperture (e.g., f/2) to determine distance (in an absolute measurement) or using the phase difference with a second (e.g., f/1.4) aperture to determine distance (in an absolute measurement), the difference between the first aperture phase difference and the second aperture phase difference may be used to determine distance (e.g., $D=P_2-P_1$, where $P_2$ is the phase difference with the second aperture as shown in FIG. 10 and $P_1$ is the phase difference with the first aperture as shown in FIG. 9). The difference (D) between the two phase differences may then be used to determine distance. Variations in phase difference estimates due to systematic errors will be similar in measurements with both apertures. Therefore, by determining the difference between the two phase differences, these systematic errors will be cancelled out and a more accurate measure of phase will be produced.

Figure 11:
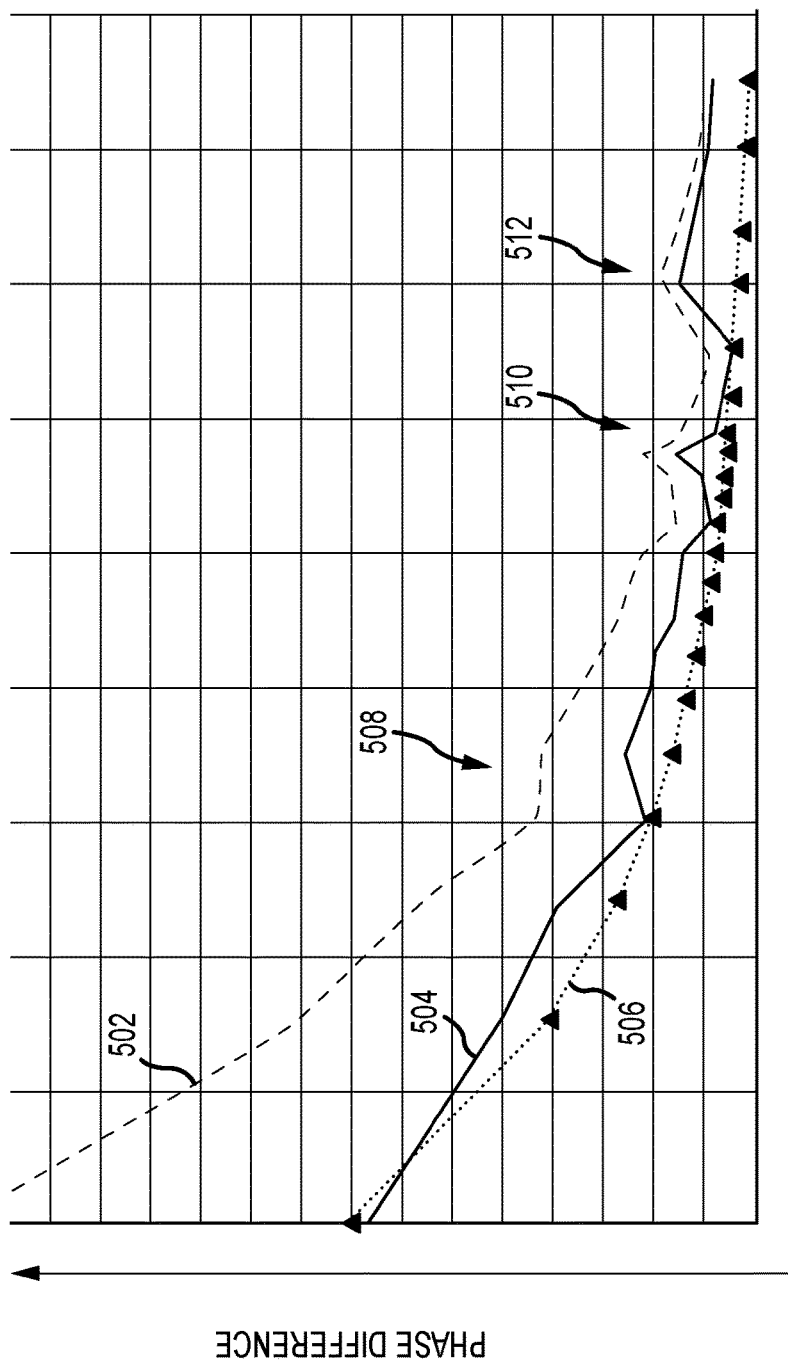
FIG. 11 is a diagram showing phase difference as a function of distance for different aperture sizes in accordance with an embodiment.

FIG. 11 shows phase difference as a function of distance for different aperture sizes. First, consider line 502, which shows the relationship between phase difference and distance for an imaging system with an aperture such as the second aperture shown in FIG. 10 (e.g., f/1.4), sometimes referred to as a lower f-number aperture. As shown, the phase difference decreases as the distance of the imaged object from the sensor increases. However, there are a few irregular portions of line 502 (particularly in regions 508, 510, and 512).

Line 504 shows the relationship between phase difference and distance for an imaging system with an aperture such as the first aperture shown in FIG. 9 (e.g., f/2), sometimes referred to as a higher f-number aperture. As shown, the phase difference decreases as the distance of the imaged object from the sensor increases. Also, the phase difference with a higher f-number aperture is smaller than the phase difference with a lower f-number aperture at the same distance. Line 504 also has irregular portions (e.g., in regions 508, 510, and 512). However, as shown in FIG. 11, the irregular portions of line 504 are similar to the irregular portions of line 502. Consequently, the difference (D) between the higher f-number phase difference and the lower f-number phase difference (shown by line 506) generally follows a smooth and regular trend regardless of distance. Therefore, using the difference (D) to determine distance may lead to higher accuracy distance measurements (and also allow larger distances to be determined by resolving finer differences in the phase information).

Figure 12:
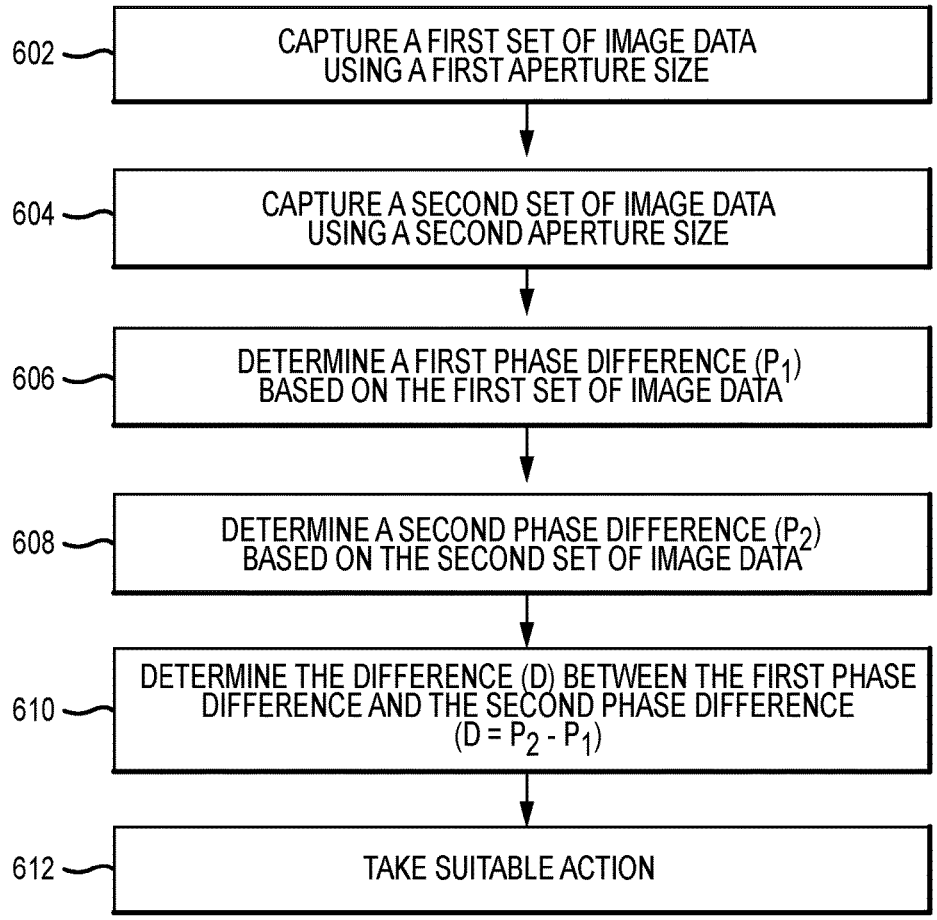
FIG. 12 is a diagram of illustrative method steps for operating an imaging system in accordance with an embodiment.

FIG. 12 is a diagram of illustrative method steps for operating an imaging system (e.g., imaging system 12 in FIG. 1). First, at step 602, the image sensor may capture a first set of image data while the shutter has a first aperture size. The first set of image data may include an image signal from each pixel in the pixel array of the image sensor. Processing circuitry may then direct the shutter (e.g., shutter 32) to change the aperture to a different size. Then, at step 604, with a second aperture size that is different than the first aperture size, the image sensor may capture a second set of image data. At step 606, the first set of image data may be used to determine a first phase difference ($P_1$). At step 608, the second set of image data may be used to determine a second phase difference ($P_2$). Next, at step 610, the difference (D) between the two phase differences may be determined (e.g., $D=P_2-P_1$). Finally, at step 612, suitable action may be taken using the difference (D). For example, the lens of the imaging system may be focused based on the difference signal D. The difference signal D may also be used to determine a distance to the object of interest in the scene. The distance determinations may be used to create a depth map of the entire captured scene. If desired, the first phase difference ($P_1$) and/or the second phase difference ($P_2$) may also be used (e.g., in combination with the difference signal D) to determine the distance to the object of interest in the scene or to focus the lens(es) in the imaging system.

Steps 606, 608, 610, and 612 may be done on a per phase detection pixel group basis, meaning that the phase differences may be determined for each phase detection pixel group (e.g., groups 100 in FIG. 6) in the pixel array of the image sensor. Similarly, the difference (D) may be determined for each phase detection pixel group individually, and the distance associated with that difference (e.g., in step 612) may be determined for each phase detection pixel group individually.

In some embodiments, phase detection pixel groups in the image sensor may be able to detect multiple types of edges (e.g., image sensor 14 in FIG. 6 may detect horizontal edges, vertical edges, or diagonal edges). Steps 606, 608, 610, and 612 may be repeated for a given phase detection pixel group for multiple edge types if desired.

The order of steps 602, 604, 606, 608, 610, and 612 presented in FIG. 12 is merely illustrative. In general, the steps of FIG. 12 may be completed in any desired order. For example, step 606 may be completed before step 604, or steps 604 and 606 may be completed at least partially in parallel. Additionally, steps 602 and 604 may be performed within any desired length of time (e.g., 1 second, less than 1 second, less than 0.1 seconds, less than 0.01 seconds, less than 0.001 seconds, greater than 0.01 seconds, etc.).

Any two desired aperture sizes may be used in steps 602 and 604. The first aperture may have an f-number of f/1.4, f/1.6, f/2, f/2.8, f/4, f/8, between f/1.4 and f/2.8, between f/1.4 and f/8, greater than f/1.4, greater than f/1.3, less than f/2, less than f/2.8, less than f/4, less than f/8, etc. Similarly, the second aperture may have an f-number of f/1.4, f/1.6, f/2, f/2.8, f/4, f/8, between f/1.4 and f/2.8, between f/1.4 and f/8, greater than f/1.4, greater than f/1.3, less than f/2, less than f/2.8, less than f/4, less than f/8, etc. The aperture size for the first image (e.g., in step 602) may be greater than or larger than the aperture size for the second image (e.g., in step 604). In other words, the image with the smaller aperture size may be taken either before or after the image with the larger aperture size.

In general, images captured using a smaller aperture size may have higher quality output image signals. However, larger aperture sizes are associated with higher, more easily measured phase differences. Therefore, improved phase detection (with a larger aperture) may require sacrificing the ultimate image quality of the captured image. However, using the method of FIG. 12, high quality image data may be obtained (using a lower aperture for one of the image captures) while still obtaining high quality phase detection information (because a higher aperture can be used for the other captured image). Because one of the images (e.g., the second image) is not required for image data, one of the images (e.g., the second image) may be optimized for phase detection data.

In the example of FIG. 12, image data is acquired twice (with two respective aperture sizes). This example is merely illustrative. If desired, additional image data may be acquired with additional different aperture sizes. In general, any desired number of images may be captured, each with a respective different aperture size. When more than two sets of image data are obtained, any two sets of data may be used to estimate the distance (e.g., $D_a=P_3-P_2$, $D_b=P_2-P_1$, and $D_c=P_3-P_1$, where $P_1$, $P_2$, and $P_3$, are the phase differences associated with respective first, second, and third sets of image data taken at different aperture sizes and $D_a$, $D_b$, and $D_c$, are difference signals).

In FIGS. 9-12, the phase detection procedure using a difference between phase differences was sometimes described in reference to an image sensor of the type shown in FIG. 6. However, it should be noted that this method (e.g., of FIG. 12) may be applied to any image sensor with phase detection pixels. For example, the image sensor may have 1×2 phase detection pixel groups that are incorporated with imaging pixels (e.g., pixels with a single photodiode covered by a single microlens) in a single pixel array. The 1×2 phase detection pixel groups may be arranged in a dashed line in rows of the pixel array, as one example. Phase detection pixel groups of additional sizes (e.g., 1×3, 1×4, 3×3, 2×4, etc.) may also be used in the image sensor 14. Any image sensor with phase detection pixels may be operated using the method of FIG. 12.

In various embodiments, a method of operating an imaging system that includes an image sensor with a plurality of phase detection pixel groups that is exposed to incident light through an aperture includes capturing a first set of image data with the image sensor while the aperture has a first size, capturing a second set of image data with the image sensor while the aperture has a second size that is different than the first size, and determining a distance between the image sensor and an imaged object based on the first and second sets of image data.

The method may also include determining a first phase difference associated with a first phase detection pixel group of the plurality of phase detection pixel groups based on the first set of image data. The method may also include determining a second phase difference associated with the first phase detection pixel group based on the second set of image data. The method may also include determining a difference between the first phase difference and the second phase difference. Determining the distance between the image sensor and the imaged object may include determining the distance between the image sensor and the imaged object based on the difference between the first phase difference and the second phase difference. Determining the distance between the image sensor and the imaged object may include determining the distance between the image sensor and the imaged object based on the first phase difference and based on the difference between the first phase difference and the second phase difference. The method may also include adjusting a lens in the imaging system based on the difference between the first phase difference and the second phase difference.

Each phase detection pixel group of the plurality of phase detection pixel groups may include at least two photosensitive regions covered by a single microlens. The method may also include, for each phase detection pixel group, determining a first respective phase difference associated with the respective phase detection pixel group based on the first set of image data, determining a second respective phase difference associated with the respective phase detection pixel group based on the second set of image data, and determining a respective difference between the first respective phase difference and the second respective phase difference. Each phase detection pixel group of the plurality of phase detection pixel groups may include four photosensitive regions in a 2×2 arrangement and the four photosensitive regions of each phase detection pixel group may be covered by a respective single microlens and a respective single color filter element.

In various embodiments, a method of operating an imaging system that includes an image sensor with a phase detection pixel group that is exposed to incident light through an aperture includes capturing a first set of image data using the image sensor while the aperture has a first size, capturing a second set of image data using the image sensor while the aperture has a second size that is different than the first size, determining a first phase difference for the phase detection pixel group based on the first set of image data, determining a second phase difference for the phase detection pixel group based on the second set of image data, and determining a difference between the first phase difference and the second phase difference.

The method may also include determining a distance between the image sensor and an imaged object based on the difference between the first phase difference and the second phase difference. The method may also include adjusting a lens in the imaging system based on the difference between the first phase difference and the second phase difference. The phase detection pixel group may have at least first and second photosensitive regions covered by a single microlens.

In various embodiments, an imaging system may include an image sensor with at least one phase detection pixel group, at least one lens configured to focus incident light onto the image sensor, a shutter that is interposed between the image sensor and the at least one lens, and processing circuitry. The shutter may be configured to define an aperture that allows incident light to reach the image sensor. The processing circuitry may be configured to determine a first phase difference based on first output signals from the image sensor, determine a second phase difference based on second output signals from the image sensor, and determine a difference between the first phase difference and the second phase difference. The first output signals may be associated with a first aperture size and the second output signals may be associated with a second aperture size that is different than the first aperture size.

The processing circuitry may be further configured to determine a distance between the image sensor and an imaged object based on the difference between the first phase difference and the second phase difference. The processing circuitry may be further configured to adjust the at least one lens based on the difference between the first phase difference and the second phase difference. The shutter may be a mechanical shutter. The shutter may be a liquid crystal display shutter. Each phase detection pixel group of the at least one phase detection pixel group may include at least first and second photosensitive regions covered by a single microlens.

The foregoing is merely illustrative of the principles of this invention and various modifications can be made by those skilled in the art. The foregoing embodiments may be implemented individually or in any combination.

What is claimed is:

1. A method of operating an imaging system that includes an image sensor that is exposed to incident light through an aperture, wherein the image sensor includes a plurality of phase detection pixel groups, the method comprising:
   while the aperture has a first size, capturing a first set of image data with the image sensor;
   while the aperture has a second size that is different than the first size, capturing a second set of image data with the image sensor; and
   based on the first and second sets of image data, determining a distance between the image sensor and an imaged object.

2. The method defined in claim 1, further comprising:
   based on the first set of image data, determining a first phase difference associated with a first phase detection pixel group of the plurality of phase detection pixel groups.

3. The method defined in claim 2, further comprising:
   based on the second set of image data, determining a second phase difference associated with the first phase detection pixel group.

4. The method defined in claim 3, further comprising:
   determining a difference between the first phase difference and the second phase difference.

5. The method defined in claim 4, wherein determining the distance between the image sensor and the imaged object comprises determining the distance between the image sensor and the imaged object based on the difference between the first phase difference and the second phase difference.

6. The method defined in claim 4, wherein determining the distance between the image sensor and the imaged object comprises determining the distance between the image sensor and the imaged object based on the first phase difference and based on the difference between the first phase difference and the second phase difference.

7. The method defined in claim 4, further comprising:
   adjusting a lens in the imaging system based on the difference between the first phase difference and the second phase difference.

8. The method defined in claim 1, wherein each phase detection pixel group of the plurality of phase detection pixel groups comprises at least two photosensitive regions covered by a single microlens.

9. The method defined in claim 8, further comprising:
for each phase detection pixel group, determining a first respective phase difference associated with the respective phase detection pixel group based on the first set of image data;
for each phase detection pixel group, determining a second respective phase difference associated with the respective phase detection pixel group based on the second set of image data; and
for each phase detection pixel group, determining a respective difference between the first respective phase difference and the second respective phase difference.

10. The method defined in claim 8, wherein each phase detection pixel group of the plurality of phase detection pixel groups comprises four photosensitive regions in a 2×2 arrangement, wherein the four photosensitive regions of each phase detection pixel group are covered by a respective single microlens and a respective single color filter element.

11. A method of operating an imaging system that includes an image sensor with a phase detection pixel group that is exposed to incident light through an aperture, the method comprising:
while the aperture has a first size, capturing a first set of image data using the image sensor;
while the aperture has a second size that is different than the first size, capturing a second set of image data using the image sensor;
determining a first phase difference for the phase detection pixel group based on the first set of image data;
determining a second phase difference for the phase detection pixel group based on the second set of image data; and
determining a difference between the first phase difference and the second phase difference.

12. The method defined in claim 11, further comprising:
based on the difference between the first phase difference and the second phase difference, determining a distance between the image sensor and an imaged object.

13. The method defined in claim 11, further comprising:
based on the difference between the first phase difference and the second phase difference, adjusting a lens in the imaging system.

14. The method defined in claim 11, wherein the phase detection pixel group has at least first and second photosensitive regions covered by a single microlens.

15. An imaging system comprising:
an image sensor with at least one phase detection pixel group;
at least one lens configured to focus incident light onto the image sensor;
a shutter that is interposed between the image sensor and the at least one lens, wherein the shutter is configured to define an aperture that allows incident light to reach the image sensor; and
processing circuitry configured to obtain two or more sets of output signals from the image sensor, determine a first phase difference based on a first set of output signals of the two or more sets of output signals, determine a second phase difference based on a second set of output signals of the two or more sets of output signals, and determine a difference between the first phase difference and the second phase difference, wherein each set of output signals of the two or more sets of output signals is associated with a different respective aperture size.

16. The imaging system defined in claim 15, wherein the processing circuitry is further configured to determine a distance between the image sensor and an imaged object based on the difference between the first phase difference and the second phase difference.

17. The imaging system defined in claim 15, wherein the processing circuitry is further configured to adjust the at least one lens based on the difference between the first phase difference and the second phase difference.

18. The imaging system defined in claim 15, wherein the shutter comprises a mechanical shutter.

19. The imaging system defined in claim 15, wherein the shutter comprises a liquid crystal display shutter.

20. The imaging system defined in claim 15, wherein each phase detection pixel group of the at least one phase detection pixel group comprises at least first and second photosensitive regions covered by a single microlens.

* * * * *